(12) United States Patent
Sudhaus et al.

(10) Patent No.: US 12,036,934 B2
(45) Date of Patent: Jul. 16, 2024

(54) METHOD AND DEVICE FOR CONTROLLING THE ELECTRICAL VOLTAGE FOR A SAFETY-RELEVANT LOAD

(71) Applicant: Elmos Semiconductor SE, Dortmund (DE)

(72) Inventors: André Sudhaus, Recklinghausen (DE); Fikret Abaza, Duisburg (DE)

(73) Assignee: Elmos Semiconductor SE, Dortmund (DE)

( * ) Notice: Subject to any disclaimer, the term of this patent is extended or adjusted under 35 U.S.C. 154(b) by 498 days.

(21) Appl. No.: 17/425,033

(22) PCT Filed: Jan. 23, 2020

(86) PCT No.: PCT/EP2020/051657
§ 371 (c)(1),
(2) Date: Jul. 22, 2021

(87) PCT Pub. No.: WO2020/152283
PCT Pub. Date: Jul. 30, 2020

(65) Prior Publication Data
US 2022/0118930 A1    Apr. 21, 2022

(30) Foreign Application Priority Data

Jan. 24, 2019 (DE) .................. 10 2019 101 732.7
Jan. 24, 2019 (DE) .................. 10 2019 101 733.5
(Continued)

(51) Int. Cl.
*B60R 21/017* (2006.01)
*G05F 1/56* (2006.01)

(52) U.S. Cl.
CPC .............. *B60R 21/017* (2013.01); *G05F 1/56* (2013.01)

(58) Field of Classification Search
CPC .................. B60R 21/01; B60R 21/017; B60R 2021/01068; B60R 2021/01075;
(Continued)

(56) References Cited

U.S. PATENT DOCUMENTS 6,150,804 A * 11/2000 Taghizadeh-Kaschani .................
G05F 1/575
323/285
2006/0217863 A1* 9/2006 Ito ......................... B60R 21/017
701/45
(Continued)

FOREIGN PATENT DOCUMENTS

DE    19748311 A    5/1998
DE    10255115 B3   7/2004
(Continued)

OTHER PUBLICATIONS

International Search Report dated May 6, 2020 re PCT/EP2020/051657 (4 pages).

*Primary Examiner* — James A English
(74) *Attorney, Agent, or Firm* — Michael J. McCandlish; Mindful IP PLLC

(57) ABSTRACT

Control circuitry for the load voltage of a safety-relevant load is sensitive to values of the load voltage outside a safe voltage range. The control circuitry includes a seventh node, a reference potential, a dominant main control circuit, and a non-dominant emergency control circuit. The seventh node is part of the dominant main control circuit, and not part of the non-dominant emergency control circuit. The load voltage of the safety relevant load drops between the seventh node and the reference potential. The dominant main control circuit includes the load voltage as a control parameter, whereas the non-dominant emergency control circuit does not. In the event of an uninterrupted dominant main control circuit, the load voltage depends on the load voltage, and in (Continued)

the event of an interrupted dominant main control circuit, does NOT depend on the load voltage but is controlled nevertheless.

21 Claims, 4 Drawing Sheets

(30) Foreign Application Priority Data

| | | |
|---|---|---|
| Jan. 24, 2019 | (DE) | 10 2019 101 735.1 |
| Jan. 24, 2019 | (DE) | 10 2019 101 739.4 |
| Jan. 24, 2019 | (DE) | 10 2019 101 741.6 |
| Feb. 27, 2019 | (DE) | 10 2019 104 912.1 |
| Apr. 17, 2019 | (DE) | 10 2019 110 096.8 |
| Apr. 17, 2019 | (DE) | 10 2019 110 099.2 |

(58) Field of Classification Search
CPC ........... B60R 2021/01061; B60R 2021/01027; B60R 2021/01156
See application file for complete search history.

(56) References Cited

U.S. PATENT DOCUMENTS

| | | | |
|---|---|---|---|
| 2013/0253774 A1* | 9/2013 | Hammerschmidt | .. B60R 21/017 701/45 |
| 2022/0080913 A1* | 3/2022 | Abaza | ................ G05B 19/0428 |

FOREIGN PATENT DOCUMENTS

| | | |
|---|---|---|
| DE | 10302789 B | 8/2004 |
| DE | 102005030770 A1 | 3/2006 |
| DE | 102005008905 A | 8/2006 |
| DE | 102005045233 A | 3/2007 |
| DE | 602004006973 T2 | 2/2008 |
| DE | 102008011681 A1 | 9/2009 |
| DE | 102010028544 A1 | 11/2011 |
| DE | 102013103104 A1 | 9/2013 |
| EP | 1602532 A | 12/2005 |
| WO | 2004087486 A1 | 10/2004 |
| WO | 2004096613 A1 | 11/2004 |
| WO | 2013182387 A1 | 12/2013 |

* cited by examiner

METHOD AND DEVICE FOR CONTROLLING THE ELECTRICAL VOLTAGE FOR A SAFETY-RELEVANT LOAD

CROSS REFERENCE TO RELATED APPLICATIONS

The present patent application is a national stage of, and claims priority to, Patent Cooperation Treaty Application No. PCT/EP2020/051657, filed on Jan. 23, 2020, which application claims the priorities of the German patent applications DE 10 2019 101 741.6 of 24 Jan. 2019, DE 10 2019 101 732.7 of 24 Jan. 2019, DE 10 2019 101 733.4 of 24 Jan. 2019, DE 10 2019 101 735.1 of 24 Jan. 2019, DE 10 2019 101 739.4 of 24 Jan. 2019, DE 10 2019 104 912.1 of 27 Feb. 2019, DE 10 2019 110 096.8 of 17 Apr. 2019 and DE 10 2019 110 099.2 of 17 Apr. 2019 the disclosures of which are incorporated in the present patent application by reference.

BACKGROUND

The disclosure relates to a method and a device for controlling the voltage for a safety-relevant load which is sensitive to voltage values outside and in particular above a nominal voltage range, wherein the load is in particular the squib of an airbag system.

In other words, the disclosure relates to a control circuit for the load voltage VL of a safety-relevant load SL which is sensitive to values of the load voltage VL outside, in particular above a safe operating area (SOA), and a method for operating the same.

Airbag systems are employed in vehicles for restraining a passenger in the case of collisions. Since these are safety-relevant devices, these devices are preferably developed in accordance with the ISO 26262 standard. When this standard is properly complied with, the probability of dangerous malfunctions of the device are reduced to below a predefined value. The disclosure suggests measures for compensating for an unintentionally interrupted intermetallic connection at a critical location of the device during operation such that a damage to the safety-relevant load (in the case of an airbag squib as an example of a safety-relevant load) by an unintentional ignition of the squib (of an airbag for generating the gases for the deployment of the airbag) is reliably precluded but the functionality of the safety-relevant load and in particular the airbag is still guaranteed.

In the case of an unintentional triggering of the airbag during the travel very serious injuries or possibly even the death of passengers may occur. Within the meaning of ISO 26262 such a disconnection of an electrical connection therefore necessitates a safety stop measure. This problem is not solved in prior art.

In the case of such a disconnection of the connection the voltage across the electric load may exceed the allowable safe operating area SOA of the electric safety-relevant load SL, here the squib load. As a consequence, the electric load squib can be thermally destroyed.

From DE-A-197 48 311 a driving circuit for a vehicle passenger safety device is known. In DE-A-10 2005 045 233 a control unit for personal safety is described.

From DE-B-103 02 789 a driving circuit for a passenger safety system without an additional safety transistor is known where the voltage is kept constant across an ignition circuit made up of a high-side transistor, the squib and a low-side transistor. Further, in DE-A-10 2005 008 905 a voltage limitation circuit for the voltage across an ignition circuit made up of a high-side transistor, a squib and a low-side transistor is described, wherein this circuit, too, is not provided with a safety switch.

From DE-A-10 2005 030 770 a circuit arrangement and a method for controlling a safety means for a vehicle are known, wherein the circuit arrangement possesses a safety transistor.

From DE-T-60 2004 006 973 (EP-B-1 602 531) a controlling device for activating a vehicle safety activating element having a safety transistor and a current control is known.

From DE-B-102 55 115 a driving circuit for a squib of a vehicle restraint system is known where the current is adjusted via the safety transistor.

DE-A-10 2010 028 544 describes a control unit for an operation of a safety system for a vehicle having a step-up converter which is configured as a switch converter and converts an input voltage bled off a vehicle battery voltage into a higher load voltage at its output. The known safety system further comprises a standby energy storage which is charged by means of the charging voltage for the operation of the safety system in an autarky case. The technical teaching of DE-A-10 2010 028 544 is characterized in that at least one step-down converter is operated in an inverted manner relative to the step-up converter, wherein the at least one step-down converter down-converts the charging voltage or a voltage outputted by the standby energy storage. Here, the step-up and step-down converters are operated via two separate SPI interfaces, which allows for an independent control.

From WO-A-2004/087486 a control unit for a restraint system is known. Here, a software element is provided via an already existing diagnosis interface of the control unit, which configures all ignition circuits and the triggering algorithm for igniting all ignition circuits and emulates such sensor values for a safety component which checks the sensor values independently of a processor in the control unit and then possibly enables the ignition circuits depending on the check of the ignition circuits such that the safety component enables these ignition circuits.

SUMMARY

It is an object of the disclosure to provide a method and a device for controlling the voltage for a safety-relevant load such that in the case of a line interruption no malfunctions of the operation of the safety-relevant load occur and its functionality is maintained.

For achieving this object, the disclosure proposes a method for controlling the voltage for a safety-relevant load, wherein in the method the control of the voltage for the safety-relevant load is performed by a main control circuit processing electric signals, and the control of the voltage for the safety-relevant load is performed by an emergency control circuit processing electric signals, when the main control circuit is interrupted, wherein the emergency control circuit is automatically activated when the main control circuit is interrupted.

According to the disclosure, it is thus provided that two control circuits (i.e. the main control circuit and the emergency control circuit) with their controlled systems and feedback lines are connected in parallel. The feedback lines of the two control circuits can extend up to the input of the controller. As long as the feedback line of the main control circuit is not interrupted, the device according to the disclosure operates in accordance with the main control circuit. If the feedback line of this main control circuit is interrupted the emergency control circuit automatically starts to operate.

The output of the controlled system of the emergency control circuit can be connected, at a connecting point along the feedback line of the main control circuit, to its feedback line. Then the main control circuit operates as long as the feedback line section between the connecting node and the output of the controlled system of the main control circuit is not interrupted. If this line section is interrupted the emergency control circuit automatically starts to operate.

The controller (as well as other electronic and line components) of a device for triggering the function of a safety-relevant load is in most cases configured as an integrated circuit. In contrast, the controlled system influencing the voltage at the safety-relevant load is designed as an external component or an external component assembly arranged outside the IC. Thus, the output of the controlled system must be connected to the associated terminal pin of the IC via an external line. Starting from this terminal pin, a connection exists inside the IC, which connection internally couples the terminal to the input of the controller. Here, the internal wiring inside the IC is realized by a bonding wire and lines provided in the integrated circuit. However, the bonding wire can detach, break or otherwise be interrupted due to thermal cycling or due to other events. The same applies to the external line between said terminal and the output of the controlled system or that switching point to which the controlled voltage for the safety-relevant load is applied. If in this feedback line of the main control circuit an interruption occurs, there is the risk that the controller tries to compensate for this interference by increasing the voltage at the safety-relevant load. This can result in damage of the safety-relevant load and possibly an undesired activation of the safety-relevant load. With respect to the example of a squib of an airbag for the safety-relevant load this means that the squib may inadvertently be ignited, i.e. the airbag is inadvertently inflated.

The error described above is reliably dealt with in such a way that an inadvertent triggering of the function of the safety-relevant load does not occur but the safety-relevant load can continue to be intentionally triggered. In the case of an interruption of the line described above the emergency control circuit assumes the control function. The value of the voltage at the input of the controlled system for the emergency control circuit only slightly differs from the value to which the voltage for the safety-relevant load has previously been controlled by the main control circuit. Thus, a significant up-regulating of the voltage at the safety-relevant load, which is not fed back due to detachment or breaking of the line, is suppressed.

It is thus advantageous when the main control circuit and the emergency control circuit comprise a controlled system having an electric impedance and when the impedance of the controlled system of the emergency control circuit is larger than the impedance of the controlled system of the main control circuit.

According to an example, it is provided that the main control circuit and the emergency control circuit comprise a common controller to whose input a control deviation variable is applied which is defined as a difference between a reference variable as a set value and a control variable as an actual value, that the main control circuit and the emergency control circuit respectively comprises its own controlled system including an input and an output, said controlled systems being connected in parallel and connecting the output of the controller to a feedback line for the control variable, wherein the output of the controlled system of the emergency control circuit is connected to the feedback line at a connecting node, which output is arranged at a smaller distance to the input of the controller than the output of the controlled system of the main control circuit, and that the main control circuit is active when the section of the feedback line between the output of the controlled system of the main control circuit and the connecting node is not interrupted and in the case of an interruption of this section of the feedback line the emergency control circuit automatically operates.

According to another example, it can be provided
that for controlling the voltage by both the main control circuit and the emergency control circuit a controller is used whose output as an actuating signal is supplied via an electric control line to a controlled system which comprises an electric controlled system element having a controllable alterable resistor which is connected in series with the safety-relevant load, wherein the actuating signal influences the value of the resistor, that the controller is supplied with a difference as an input variable between a reference signal and a control signal, wherein the reference signal is defined as an upper limit value of the nominal voltage range and the control signal is the output signal of the controlled system and thus the voltage value produced at the safety-relevant load, and wherein the control signal is fed back as a feedback signal to the controller via an electric feedback line for producing a control deviation signal, that between the control line and the feedback line an electric connecting component connecting these two lines is arranged, which connecting component represents the voltage difference between the actuating signal and the control signal, that the main control circuit comprises the controller and the controlled system, that the emergency control circuit comprises the controller and the connecting component, and that the control of the voltage for the safety-relevant load SL automatically transitions from the main control circuit to the emergency control circuit in the case of an interruption of the feedback line occurring between the output of the controlled system and the connecting node of connecting component and feedback line.

The electric controlled system element of the controlled system of the main control circuit and the connecting component of the controlled system of the emergency control circuit respectively has an electric impedance, wherein the impedance of the connecting component is advantageously larger than the impedance of the controlled system element.

The connecting component can comprise one or a plurality of electric and/or electronic components (see above).

The controlled system element can be voltage-controlled, and the actuating signal can be a voltage signal, wherein the connecting component comprises a resistor which is connected between the control line and the feedback line.

Alternatively or additionally, it can be provided that the connecting component comprises a unidirectionally electrically conducting blocking component, in particular a diode or a diode-configured transistor, wherein the unidirectionally conducting blocking component suppresses a current flow from the connecting node of the feedback line to the control line and allows said current flow in the reverse direction when the voltage drop across the connecting component has the polarity and/or magnitude required for the activation of the conductive function.

The controlled system element of the main control circuit typically is a transistor having a control terminal for receiving the actuating signal existing at the output of the controller and comprises a current path which is variable in terms of its ohmic resistance and to which the safety-relevant load is series-connected.

According to the disclosure, the device and/or the method can be used for one or a plurality of safety-relevant loads, wherein the plurality of safety-relevant loads are connected in parallel to each other.

The feedback line of the main and the emergency control circuit can comprise a voltage divider having a central tapping node which is connected to the input of the controller for feeding back a value representing the control signal and being smaller than the voltage value produced at the safety-relevant load.

As a common controller for the two control circuits a controller having an I-component compensating the control deviation signal to 0 and in particular a PI or PID controller is suitable.

Further, for achieving the object stated above, the disclosure proposes a device for controlling the voltage for a safety-relevant load, wherein the device comprises
- a main control circuit comprising a controller having an input for a control deviation signal as well as an output for outputting an actuating signal, and a controlled system influencing the voltage at the safety-relevant load as a control signal,
- wherein the output of the controller is connected to the input of the controlled system via a control line and the control signal at the output of the controlled system is adapted to be fed back to the input of the controller via a feedback line,
- wherein the control deviation signal is the difference between the control signal and a reference signal which is defined as an upper limit value of the nominal voltage range, and
- an emergency control circuit which comprises the controller and an electric connecting component arranged in parallel to the controlled system and connecting the control line to the feedback line,
- wherein, when the control signal whose function is to produce the control deviation signal is omitted, said signal is automatically produced as the difference between the signal at the connecting node of connecting component and feedback line on the one hand and the reference signal on the other hand.

According to another example, it can be provided that the main control circuit and the emergency control circuit comprise a common controller at whose input a control deviation variable exists which is defined as a difference between a reference variable as a set value and a control variable as an actual value, that the main control circuit and the emergency control circuit respectively comprises its own controlled system including an input and an output, said controlled systems being connected in parallel and connecting the output of the controller to a feedback line for the control variable, wherein the output of the controlled system of the emergency control circuit is connected to the feedback line at a connecting node, which output is arranged at a smaller distance to the input of the controller than the output of the controlled system of the main control circuit, and that the main control circuit is active when the section of the feedback line between the output of the controlled system of the main control circuit and the connecting node is not interrupted and in the case of an interruption of this section of the feedback line the emergency control circuit automatically operates.

The controlled systems of the main control circuit and the emergency control circuit respectively has an electric impedance, wherein the impedance of controlled system of the emergency control circuit is larger than the impedance of the main control circuit.

The electric controlled system element of the controlled system of the main control circuit and the connecting component of the controlled system of the emergency control circuit respectively has an electric impedance, wherein the impedance of the connecting component is larger than the impedance of the controlled system element.

The connecting component comprises one or a plurality of electric and/or electronic components.

Across the connecting component the voltage difference between the actuating signal and the control signal drops.

The controlled system element is voltage-controlled, and the actuating signal is a voltage signal, wherein the connecting component comprises a resistor which is connected between the control line and the feedback line.

The connecting component comprises a unidirectionally electrically conducting blocking component, in particular a diode or a diode-configured transistor, wherein the unidirectionally conducting blocking component suppresses a current flow from the connecting node of the feedback line to the control line and allows said current flow in the reverse direction.

The controlled system element comprises a transistor having a control terminal for receiving the actuating signal existing at the output of the controller and a current path which is variable in terms of its ohmic resistance and to which the safety-relevant load is series-connected.

The feedback line comprises a voltage divider having a central tapping node which is connected to the input of the controller for feeding back a value representing the control signal and being smaller than the voltage value produced at the safety-relevant load.

As a common controller for the two control circuits a controller having an I-component compensating the control deviation signal to 0 and in particular a PI or PID controller is suitable.

BRIEF DESCRIPTION OF DRAWINGS

Hereunder the disclosure will be explained in detail on the basis of an example with reference to the drawings in which.

DESCRIPTION

Figure 1:
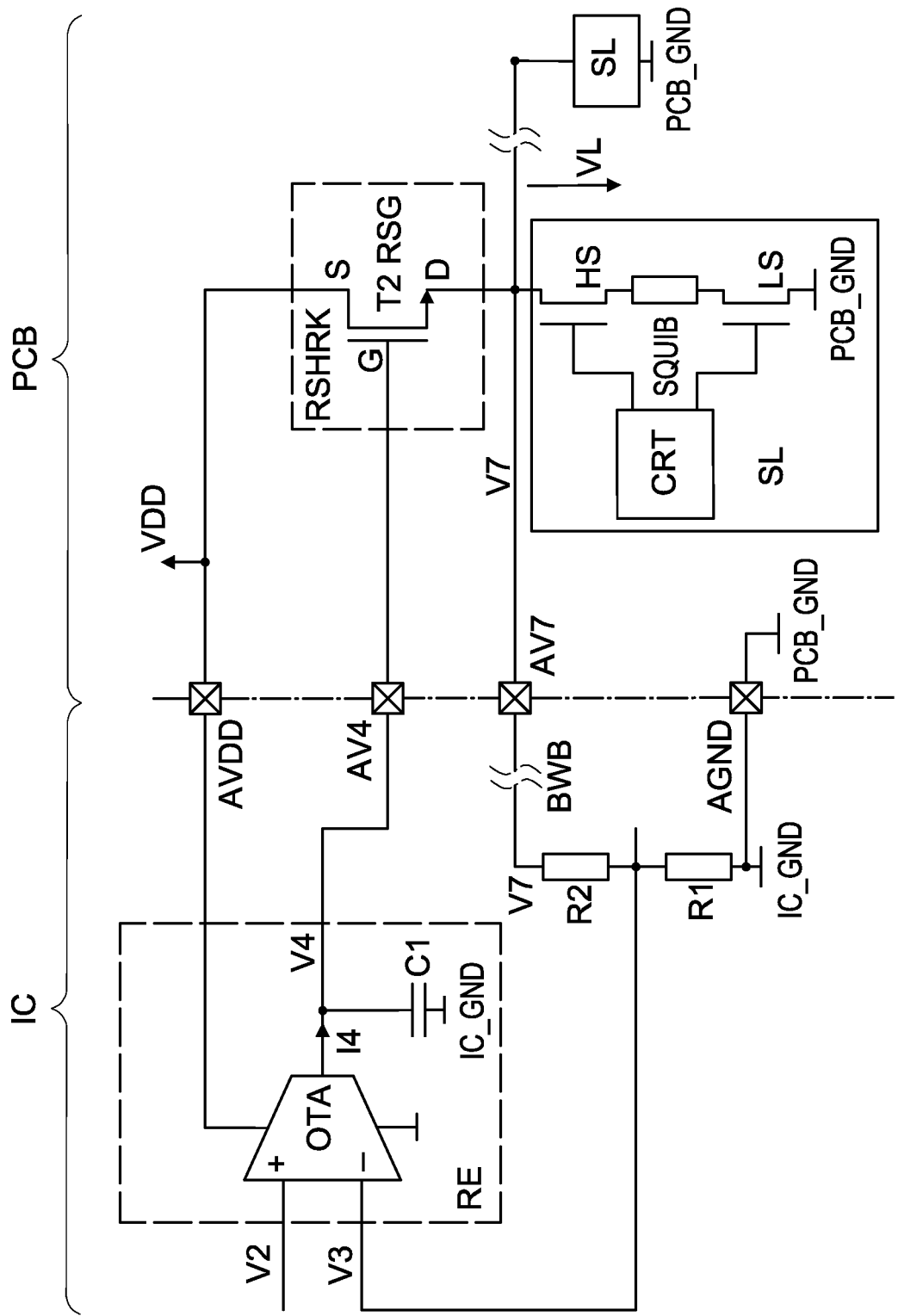
FIG. 1 shows an example of a prior art driving circuit of a squib of an airbag.

The disclosure described above can also be expressed in a different way which is described below.

Accordingly, the disclosure relates to a method for controlling the load voltage VL of a safety-relevant load SL which is sensitive to load voltage values of the load voltage VL outside a safe operating area SOA, comprising the steps of controlling the load voltage across a dominant main control circuit HRK, e.g. OTA, C1, V4, T1, V5, V6, T2, V7, SL, R2, R1, V3, if this dominant main control circuit HRK, e.g. OTA, C1, V4, T1, V5, V6, T2, V7, SL, R2, R1, V3, is not interrupted, and controlling the load voltage V7 across a non-dominant emergency control circuit, e.g. OTA, C1, V4, T1, V5, R3, V7', R2, R1, V3, if this dominant main control circuit HRK, e.g. OTA, C1, V4, T1, V5, V6, T2, V7, SL, R2, R1, V3, is interrupted.

Such a "two-step" control is not known from prior art.

A first alternative of a circuit according to the disclosure relates to a control circuit for the load voltage VL of a safety-relevant load SL which is sensitive to load voltage values of the load voltage VL outside a safe operating area SOA, comprising a seventh node V7, and
comprising a reference potential PCB_GND, and
comprising a dominant main control circuit, e.g. OTA, C1, V4, T1, V5, V6, T2, V7, SL, R2, R1, V3, and
comprising a non-dominant emergency control circuit NRK, e.g. OTA, C1, V4, T1, R3, V7', R2, R1, V3,
wherein the seventh node V7 is part of the dominant main control circuit HRK, e.g. OTA, C1, V4, T1, V5, V6, T2, V7, SL, R2, R1, V3, and
wherein the seventh node V7 is not part of the non-dominant emergency control circuit, e.g. OTA, C1, V4, T1, R3, V7', R2, R1, V3, and
wherein the seventh node V7 is connected to the safety-relevant load SL, and
wherein the safety-relevant load SL is connected to the reference potential PCB_GND, and
wherein the load voltage VL drops between the seventh node V7 and the reference potential PCB_GND, and
wherein the dominant main control circuit HRK, e.g. OTA, C1, V4, T1, V5, V6, T2, V7, SL, R2, R1, V3, has the load voltage VL as a control parameter at at least one location of the control loop of the dominant main control circuit, and
wherein the non-dominant emergency control circuit NRK, e.g. OTA, C1, V4, T1, R3, V7', R2, R1, V3, does not have the load voltage VL as a control parameter at any location of the control loop of the non-dominant emergency control circuit NRK, and
wherein the load voltage VL depends on the load voltage VL in the case of an uninterrupted dominant main control circuit HRK, e.g. OTA, C1, V4, T1, V5, V6, T2, V7, SL, R2, R1, V3, and
wherein the load voltage VL is not dependent on the load voltage VL in the case of an interrupted dominant main control circuit HRK, e.g. OTA, C1, V4, T1, V5, V6, T2, V7, SL, R2, R1, V3, and is controlled.

Such a two-step control is not known in prior art.

According to another alternative of the disclosure, the latter relates to a control circuit for the load voltage VL of a safety-relevant load SL which is sensitive to load voltage values of the load voltage VL outside a safe operating area SOA, comprising a third node V3, and
comprising a fourth node V4, and
comprising a fifth node V5, and
comprising an optional sixth node V6, and
comprising a seventh node V7, and
comprising a transconductance amplifier OTA having a positive input + and a negative input −, and
comprising a first transistor T1, and
comprising a second transistor T2, and
comprising a first resistor R1, and
comprising a second resistor R2, and
comprising a third resistor R3, and
comprising a capacitor C1, and
comprising a reference potential PCB_GND, IC_GND,
wherein the load voltage VL drops between the seventh node V7 and the reference potential PCB_GND, and
wherein the output V4 of the transconductance amplifier OTA is constituted by the fourth node V4, and
wherein the capacitor C1 can be regarded as being effective between the fourth node V4 and the reference potential IC_GND, and
wherein the control terminal of the first transistor T1 is connected to the fourth node V4, and
wherein the drain terminal of the first transistor T1 is connected to the fifth node V5 or the sixth node V6,
wherein the third resistor R3 is connected between the fifth node V5 and the seventh node V7, and
wherein the second resistor R2 is connected between the seventh node V7 and the third node V3, and
wherein the first resistor R1 is connected between the third node V3 and the reference potential IC_GND, and
wherein the third node V3 is connected to the negative input − of the transconductance amplifier OTA, and
wherein the seventh node V7 is connected to the safety-relevant load SL, and
wherein the safety-relevant load SL is connected between the seventh node V7 and the reference potential PCB_GND, and
wherein the drain terminal of the second transistor T2 is connected to the seventh node V7, and
wherein the control electrode of the second transistor T2 is connected to the fifth node V5, possibly via a first switch S1, and
wherein the value of the third resistor R3 is of such a high-resistance configuration that the load voltage VL between the seventh node V7 directly at the terminal of the safety-relevant load SL at this seventh node V7 and the reference potential PCB_GND essentially determines the voltage between the third node V3 with respect to the reference potential IC_GND.

The third resistor R3 is suitably selected such that in the case of a control circuit interruption BWB between the seventh node V7 and the second transistor T2 the voltage increase at the output of the first transistor T1, node V4 with respect to the terminal at the second resistor V7' at R2 approximately equals (for example deviations of max. up to 25% or max. up to 15% or max. up to 10% or max. up to 5% or max. up to 3% or max. up to 1%) the voltage produced in the uninterrupted operation between the sixth node V6 (gate of T2) and the output V7 (source of T2), i.e. the value of the third resistor can be roughly calculated.

The first switch S1 and the combination of the first resistor R1 and the second resistor R2 and the third resistor R3 and their interconnection are not known in prior art.

The disclosure will be explained with reference to the figures proceeding from prior art.

The prior art corresponds to a circuit as per FIG. 1. The circuit is divided into an integrated microelectronic circuit IC for checking and driving the ignition device (as an example of the safety-relevant load SL) for the airbag and a printed circuit board PCB. A plurality of loads SL can be connected in parallel as is normally the case for vehicle airbag systems since they comprise a plurality of airbags arranged in a distributed manner in the interior of the vehicle. The integrated microelectronic circuit IC is typically accommodated on the printed circuit board PCB and thus forms part of the printed circuit board. Thus, the reference numeral PCB designates the remainder of the printed circuit board. Here, the partitioning between IC and PCB is only exemplary and can be different in individual cases.

A transconductance amplifier OTA (as an example of a controller) feeds an output current I4 into the fourth node V4. Here, the transconductance amplifier OTA uses the capacitor C1 for a current-voltage conversion for converting its output current I4 into a control voltage for the control terminal of an external (second) transistor T2 which constitutes the controlled system of the (main) control circuit HRK. The capacitor C2 can be a parasitic component capacitor, for example the gate-source capacitor of the second transistor T2. However, this need not necessarily be the case. In addition, it should be appreciated that further variants for the compensation of such a voltage controller across the capacitor C1 and/or further capacitors optionally having different reference potentials are known to a person skilled in the art from prior art. The compensation circuit shown made up of transconductance amplifier OTA and capacitor C1 in FIG. 1 is typically referred to as a compensation circuit of TYPE I in prior art. (Here, I designates the inclusion of the I component into the control loop). Also, a compensations circuit of TYPE II can be used which comprises two poles and one zero point, for example. Further, the use of a compensation circuit of TYPE III having two poles and two zero points, for example, is possible. However, a compensation circuit of TYPE III is typically very complex and complicated and is not recommendable for the typically intended use of the device which should comprise a simple and cost-efficient controlled system.

A compensation circuit of TYPE III is used in DC-DC converters for the "voltage mode control", for example, for stabilizing a transmission path of second order. With the aid of compensation circuits of type III, the stability of the respective control circuit in the range of −40 db/dec is created.

The use of such complex compensation circuits is included in the disclosure.

With the aid of the control voltage the transconductance amplifier OTA switches the external second transistor T2 constituting the controlled system element RSHRK of the (main) control circuit whose conductivity or resistance is adapted to be controlled by the actuating signal at the gate G, if necessary. Here, the output current I4 (actuating signal) of the transconductance amplifier OTA is preferably proportional to the difference between the voltage potential at its positive input + minus the voltage potential at its negative input −. The system is supplied with electric power from a supply voltage line VDD and a reference potential line PCB_GND of the printed circuit board PCB.

The reference potential line IC_GND of the integrated circuit IC is connected to the reference potential line PCB_GND of the printed circuit board PCB via a terminal AGND of the reference potential line IC_GND of the integrated circuit IC.

The supply voltage line of the integrated circuit IC is connected to the supply voltage line VDD of the printed circuit board PCB via a terminal AVDD of the supply voltage line of the integrated circuit IC.

The source terminal S of the second transistor T2 is connected to the supply voltage line VDD. The drain terminal D of the second transistor T2 is connected to a seventh node V7. Between the seventh node V7 and preferably the reference potential PCB_GND of the printed circuit board PCB the squib load SL is connected. It normally comprises a series connection of a first ignition transistor, an explosive device (the squib) and a second ignition transistor. This series connection made up of these three elements is illustrated only as a block SL for the sake of clarity. This squib load thus includes the two safety switches HS and LS for igniting the SQUIB and the SQUIBs themselves as merely indicated in FIG. 1 with the respective controls CNTR and control lines.

The seventh node V7 is connected, via a terminal AV7 of the integrated circuit IC, to the first terminal of a second resistor R2 of a voltage divider forming part of the integrated circuit IC. The second terminal of the second resistor R2 is connected to the first terminal of a first resistor R1 of the voltage divider and a third node V3 in the integrated circuit IC. The second resistor R2 and the first resistor R1 together constituting the voltage divider can in reality be replaced by more complex circuits having similar functions. The third node V3 constitutes the negative input − of the transconductance amplifier OTA and represents the fed-back actual or control signal, i.e. the voltage of the seventh node V7. The positive input + of the transconductance amplifier OTA is connected to a second node V2 to which the set or reference signal is applied. In the example of FIG. 1, the transconductance amplifier OTA is supplied with electric power from the supply voltage line VDD of the printed circuit PCB via a terminal AVDD of the integrated circuit IC and the reference potential line IC_GND of the integrated circuit IC. In the example of FIG. 1, the capacitor C1 is connected between the output V4 of the transconductance amplifier OTA and the reference potential line IC_GND of the integrated circuit IC (i.e. signal ground). By amplifying the signal at the second node V2 an ignition of the squib load SL can be enabled.

The problem to be solved here only occurs in the case of a potential critical line detachment BWB between the second resistor R2 and the seventh node V7 located between the second transistor T2 and the squib load SL. This detachment can e.g. be an IC-internal bonding wire detachment or an interruption of the IC-external line between the terminal AV7 and the node V7. The second transistor T2 is then still connected to the squib load SL. Despite the line interruption and thus the stopped feedback of the actual value to the controller an ignition of the squib load SL is thus not prevented.

It is normally even more important than the interruption of the inadvertent ignition that the ignitability is limited by the error since possibly safe operating areas SOA can be violated by the operation in this error state after an error has occurred. Thus, further ignitions in the error mode can be suppressed.

The squib load SL can then be loaded with a voltage of more than 30 V at a potential supply voltage VDD of 30 V relative to the reference potential PCB_GND of 33 V, for example. Thereby, the squib load SL can be damaged or even ignited. In any case, here the range of the allowable operating values of the squib load SL (safe operating area or SOA violation) is left.

Figure 2:
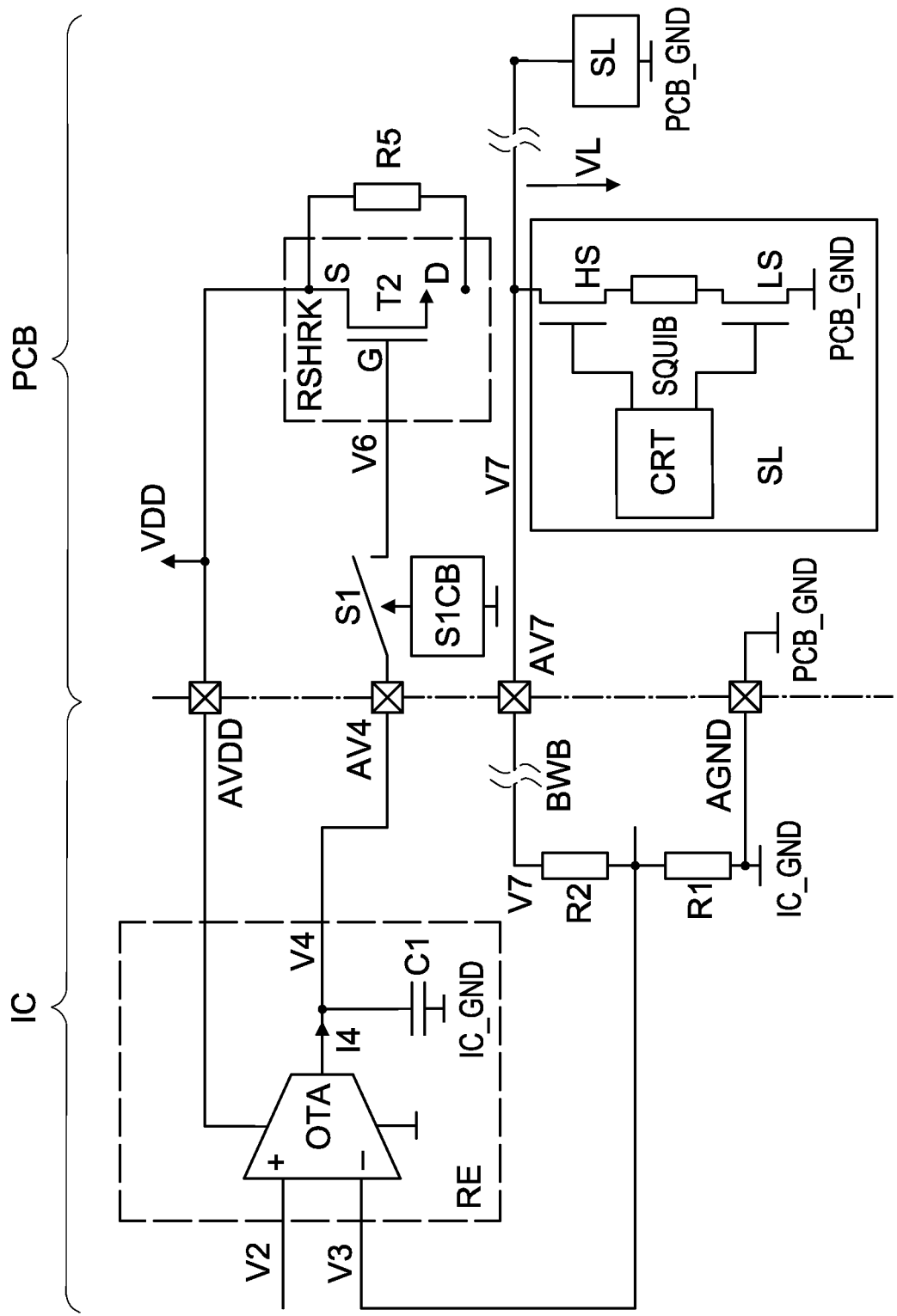
FIG. 2 shows the driving circuit of FIG. 1 having an additional safety switch.

For increasing the safety of the overall device, an additional (first) switch S1 can be provided (see FIG. 2). Preferably, this first switch S1 is externally arranged outside the integrated circuit IC. An exemplary realization of this first switch is shown in FIG. 3.

Preferably, the first switch S1 is operated by a microcomputer not illustrated which preferably forms part of the device. Preferably, the microcomputer forms part of a control block S1CB for the first switch S1 which may have further functions. The first switch S1 and the control block S1CB for the first switch S1 can form part of the integrated circuit IC. Preferably, they are, however, arranged externally of the integrated circuit IC as part of the printed circuit board PCB for increasing the safety. This external first switch S1 allows for testing the second transistor T2. An analog-to-digital converter not shown which preferably forms part of the integrated circuit IC can check the behavior of the control circuit after the first switch S1 has been opened. The first switch S1 is connected between the output V4 of the transconductance amplifier OTA and the control input of the second transistor T2, the sixth node V6, and controlled by the control block S1CB for the first switch S1.

Figure 3:
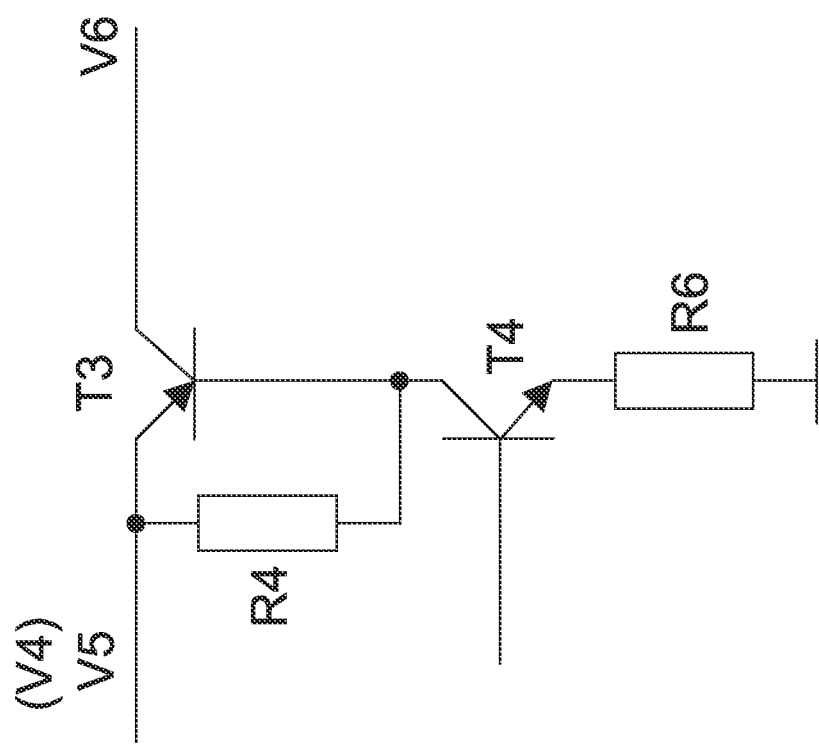
FIG. 3 shows an example of an example of this safety switch.

FIG. 3 shows an exemplary proposed external first switch S1. The circuit is connected to the fifth node V5 which will be described later, or, when the circuit of FIG. 2 is used, to the output V4 of the transconductance amplifier OTA. Further, the exemplary circuit of the first switch S1 is connected to the control terminal of the second transistor T2 via a sixth node V6. Therebetween, the third transistor T3 is connected which represents the actual switch. Its base is connected to its emitter via a fourth resistor R4. This base of the third transistor T3 is driven via a fourth transistor T4 and a sixth resistor R6. The base of the fourth transistor T4 is then driven by the microcomputer not shown or the control block S1CB for the first switch S1. Other realizations of the first switch S1, e.g. in the form of a relay, are conceivable.

This modification of the circuit of FIG. 1 by the additional external first switch S1 is illustrated in FIG. 2.

This external first switch S1 would put a strain on the transconductance amplifier OTA in the case of an interconnection as per FIG. 2. The output V4 of the transconductance amplifier OTA should therefore be decoupled by a source follower as shown in FIG. 4.

Figure 4:
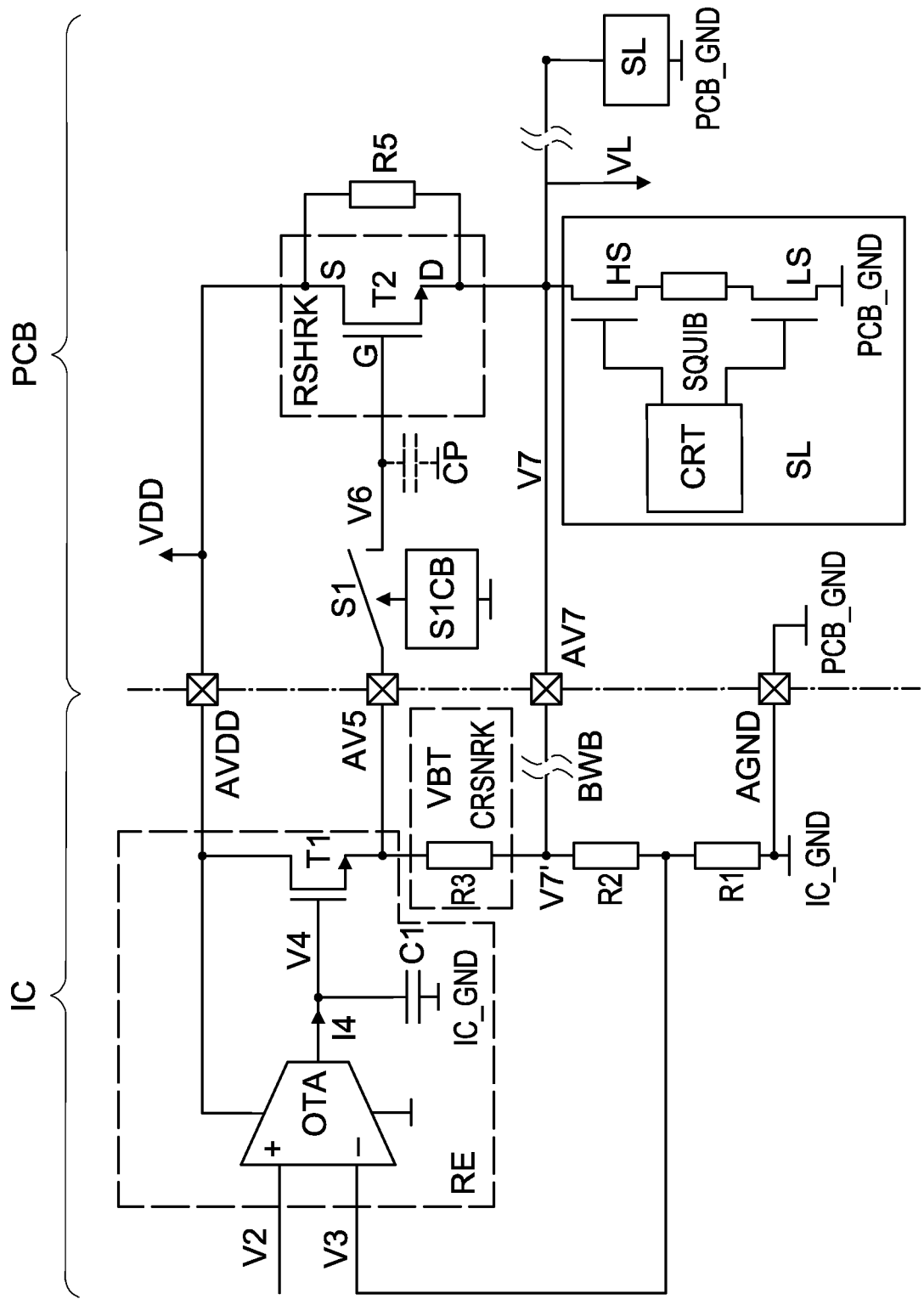
FIG. 4 shows the driving circuit for a squib according to prior art, wherein the safety switch shown in this figure need not necessarily be a subject matter of the disclosure.

In FIG. 4 the output node V4 of the transconductance amplifier OTA is split up into a fourth node V4 which continues to be the output V4 of the transconductance amplifier OTA, and a fifth node V5. The fifth node V5 is now preferably connected to the first switch S1 instead of the output V4 of the transconductance amplifier OTA.

The advantage of this interconnection is in particular that due the first transistor T1 further external circuits, such as the control block S1CB for the first switch S1 or passive elements, for example, represent a load which does not adversely affect the control behavior. Such passive, typically parasitic elements are not shown in FIG. 4 for the sake of clarity, but are obvious to a person skilled in the art.

The control terminal of the first transistor T1 which preferably forms part of the integrated circuit IC is connected to the output V4 of the transconductance amplifier OTA. The drain connector D of this first transistor T1 is connected to said fifth node V5 and thus to the first switch S1. In contrast to prior art, the fifth node V5 is, however, now additionally connected to the seventh node V7 via a third resistor R3 constituting the controlled system RSNRK of an emergency control circuit. If the third resistor R3 is of an adequately high-resistance configuration, the potential at the negative input − of the transconductance amplifier OTA continues to be mainly determined by the potential at the seventh node V7 as long as it is available, i.e. the connecting line for the feedback of the control signal is not interrupted, and not by the potential of the fifth node V5.

By including the first transistor T1 operated as a source follower, which is not relevant to the disclosure, and including the third resistor R3, besides the external dominant main control circuit HRK an additional weaker and non-dominant internal emergency control circuit NRK made up of the first transistor T1, the third resistor R3, the second resistor R2 and the first resistor R1 is provided via the second transistor T2, the squib load SL and the voltage divider comprising the first resistor R1 and the second resistor R2, wherein it should be appreciated that the first transistor T1 and/or the voltage divider comprising the first and the second resistor R1, R2 are not absolutely necessary for the disclosure.

A characteristic of the third resistor R3, which should be mentioned here, is that preferably the impedance value of the third resistor R3 should be considerably larger than the impedance values at the source terminal S of the second transistor T2, i.e. at the seventh node V7, during operation of the circuit. The impedance value of the third resistor R3 should, however, preferably be selected taking into account the value of the predefined R1/R2 ratio of the impedance value of the first resistor R1 to the impedance value of the second resistor R2 and to their impedance values.

The non-dominant emergency control circuit NRK always assumes the controller function when the external main control circuit HRK is interrupted at a high resistance. This is in particular the case for said line detachment BWB. This internal non-dominant emergency control circuit NRK is preferably completely located inside the integrated circuit IC.

The additional first transistor T2 thus has two functions:

In normal operation the first transistor T1 serves as a driver for a load connected to the control terminal, the sixth node V6 of the external second transistor T2.

In the case of an error, the first transistor T1 serves as a driver for the internal non-dominant emergency control circuit NRK via the third resistor R3, the second resistor R2 and the first resistor R1.

In normal operation without line detachment BWB, the control is carried out as follows:

The second transistor T2 is an external transistor which is driven with an error amplifier (made up of the transconductance amplifier OTA), the capacitor C1, the first transistor T1 and via the first switch S1. In this case, the first transistor T1 operates as a source follower. Typically, the third resistor R3 is negligible for this control case due to its low impedance at the source of the first transistor T1 and at the source of the second transistor T2.

During maloperation in the case of line detachment BWB (i.e. without interruption of the external line section between the terminal AV7 of the integrated circuit IC, in the case of a faulty connection at the terminal AV7 and/or in the case of a bonding wire detachment inside the integrated circuit IC) the control is carried out as follows:

The effect of the third resistor R3 is no longer overwritten and suppressed by the second transistor T2 since the connection between the internal seventh node V7' and the external seventh node V7 and thus to the second transistor T2 is interrupted. Thus, the potential of the internal seventh node V7' is no longer determined by the second transistor T2 but the voltage divider made up of the third resistor R3, the second resistor R2 and the first resistor R1 as well as the potential at the output V4 of the transconductance amplifier OTA. In contrast to prior art, thus in the case of a line detachment BWB a new internal non-dominant emergency control circuit is produced which provides a defined potential below the ignition threshold and within the allowable operating range of the squib load SL at the seventh node V7. This internal non-dominant emergency control circuit comprises the transconductance amplifier OTA, the first resistor R1, the second resistor R2, the third resistor R3, the capacitor C1 and the first transistor T1. In this case the external second transistor T2 operates as a source follower.

Due to the external first safety switch S1 the squib in the squib load SL can have smaller dimensions and is thus more cost-efficient.

The additional fifth resistor R5 assumes the control for the normal case (non-ignition) where the first switch S1 is open for test purposes for checking the second transistor T2. The function of the additional fifth resistor R5 is essentially to supply the squib load SL from a limited impedance for diagnosis purposes. This in particular concerns a diagnosis which can be regarded as safe in terms of inadvertent ignition (see the aforementioned patent applications DE 10 2019 101 741.6, DE 10 2019 101 739.4, DE 10 2019 101 735.1, DE 10 2019 101 733.4 and DE 10 2019 101 732.7).

Here, the potential at the control terminal V6 of the second transistor T2 is maintained by second capacitor Cp. Typically, it suffices when the second capacitor Cp is the parasitic gate capacitor of the second transistor T2.

Thus, the disclosure relates to a control circuit for the load voltage VL of a safety-relevant load SL which is sensitive to load voltage values of the load voltage VL outside a safe operating area SOA of the load voltage VL. The control circuit comprises a seventh node V7, a reference potential PCB_GND and a dominant main control circuit HRK, e.g. OTA, C1, V4, T1, V5, V6, T2, V7, SL, R2, R1, V3, and a non-dominant emergency control circuit NRK, e.g. OTA, C1, V4, T1, R3, R2, R1. Here, the seventh node V7 is connected to the safety-relevant load SL. The safety-relevant load, here the squib load SL, is connected to the reference potential PCB_GND or indirectly via possibly existing further components. The load voltage VL drops between the seventh node V7 and the reference potential PCB_GND on the printed circuit board PCB. The reference potential PCB_GND of the printed circuit board PCB and the reference potential IC_GND inside the integrated circuit preferably have a fixed ratio to each other or are preferably even the same. The dominant main control circuit HRK which is preferably constituted by the transconductance amplifier OTA, the capacitor C1, the fourth node V4, the first transistor T1, the fifth node V5, the sixth node V6, the second transistor T2, the seventh node V7, the safety-relevant load SL, the second resistor R2, the first resistor R1 and the third node V3 has the load voltage VL as a control parameter at at least one location of the control loop of the dominant main control circuit HRK. The non-dominant emergency control circuit NRK which is preferably constituted by the transconductance amplifier OTA, the capacitor C1, the fourth node V4, the first transistor T1, the third resistor R3, the internal seventh node V7', the second resistor R2, the first resistor R1 and the third node V3 has the load voltage as a control parameter preferably at no location of the control loop of the non-dominant control circuit NRK. Here, the load voltage VL depends a. in the case on an uninterrupted dominant main control circuit HRK, e.g. OTA, C1, V4, T1, V5, V6, T2, V7, SL, R2, R1, V3 on the dominant main control circuit HRK, e.g. OTA, C1, V4, T1, V5, V6, T2, V7, SL, R2, R1, V3, and b. in the case of an interrupted dominant main control circuit HRK, e.g. OTA, C1, V4, T1, V5, V6, T2, V7, SL, R2, R1, V3, on the non-dominant emergency control circuit NRK, e.g. OTA, C1, V4, T1, R3, V7', R2, R1, V3.

More precisely, the disclosure relates to a control circuit for the load voltage VL of a safety-relevant load SL which is sensitive to load voltage values of the load voltage VL outside a safe load operating area SOA, having a third node V3, a fourth node V4, a fifth node V5, an optional sixth node V6, a seventh node V7, a transconductance amplifier OTA having a positive input + and a negative input −, a first transistor T1, a second transistor T2, a first resistor R1, a second resistor R2, a third resistor R3, a capacitor C1 and a reference potential PCB_GND, IC_GND. Here, the output V4 of the transconductance amplifier OTA is constituted by the fourth node V4. The capacitor C1 can be regarded as being effective between the fourth node V4 and the reference potential IC_GND. In principle it is only important that the component used and its connection has the same functional effect as such a capacitor C1. This can be a parasitic component, for example. The control terminal of the first transistor T1 is connected to the fourth node V4, whereby the first transistor T1 is controlled by the voltage via the capacitor C1 which is produced by the integration of the output current I4 of the transconductance amplifier OTA from its output V4 into the capacitor C1. The drain terminal of the first transistor T1 is preferably connected to the fifth node V5 or the sixth node V6. If no first switch S1 is used, the sixth node V6 and the fifth node V5 are connected to each other. If a first switch S1 is used, this first switch S1 is connected to the fifth node V5 on one side and to the sixth node V6 on the other side, and in this case the control terminal of the second transistor T2 is connected to the sixth node V6.

The third resistor R3 is connected between the fifth node V5 and the seventh node V7. The second resistor R2 is connected between the seventh node V7 and the third node V3. The first resistor R1 is connected between the third node V3 and the reference potential IC_GND. The third node V3 is connected to the negative input − of the transconductance amplifier OTA. The seventh node V7 is connected to the safety-relevant load SL. The safety-relevant load SL is connected between the seventh node V7 and the reference potential PCB_GND. The drain terminal of the second transistor T2 is connected to the seventh node V7. The control electrode of the second transistor T2 is connected to the fifth node V5, possibly via a first switch S1 and said sixth node V6 (see FIG. 4).

Here, the value of the third resistor R3 is preferably of such a high resistance that the load voltage between the seventh node directly at the terminal of the safety-relevant load SL at this seventh node V7 and the reference potential PCB_GND essentially determines the voltage between the third node V3 relative to the reference potential IC_GND.

The disclosure relates to a method for controlling the load voltage VL of a safety-relevant load SL which is sensitive to load voltage values of a load voltage VL outside a safe operating area SOA. It comprises the steps of a. controlling the load voltage VL via a dominant (main) control circuit HRK, e.g. OTA, C1, V4, T1, V5, V6, T2, V7, SL, R2, R1, V3, if this dominant main control circuit HRK, e.g. OTA, C1, V4, T1, V5, V6, T2, V7, SL, R2, R1, V3, is not interrupted, and b. controlling the load voltage VL via a non-dominant (emergency) control circuit NRK, e.g. OTA, C1, V4, T1, V5, R3, V7', R2, R1, V3, if this dominant main control circuit HRK, e.g. OTA, C1, V4, T1, V5, V6, T2, V7, SL, R2, R1, V3, is interrupted.

Such a control circuit for the load voltage VL across a safety-relevant load SL in at least some realizations allows for reducing the maximum voltage occurring at the safety-relevant load SL. However, the advantages are not limited thereto.

Due to the additional first transistor T1 and the third resistor R3 the safety requirement is met that the squib inside the squib load SL must not be damaged by an excessive voltage at the seventh node V7 such that less powerful and thus more cost-efficient squib loads than those of prior art can be used.

The economic advantage is that the external circuit of the first switch S1 comprises only a few inexpensive components and the use of this external circuit of the first switch S1 allows for the squib inside the squib load SL to have a narrower safe operating area SOA and can thus be selected to be smaller and be manufactured in a more cost-efficient manner. This is technically possible since due to the double safeguarding only 21.7 V instead of approximately 30 V, for example, can reach the squib inside the squib load SL, for example. The proposed controller structure having a dominant external control loop and a non-dominant internal control loop thus prevents any violation of the safe operating area SOA.

LIST OF REFERENCE NUMERALS

AGND terminal of the reference potential line IC_GND of the integrated circuit IC to the reference potential line PCB_GND of the printed circuit board PCB;
AV5 terminal of the V5 voltage or V5 line;
AV7 terminal of the V7 voltage or V7 line or the seventh node V7;
AVDD terminal of the supply voltage line of the integrated voltage IC to the supply voltage line VDD of the printed PCB;
B_I_PCB exemplary boundary between the integrated circuit IC and the printed circuit board PCB;
BWB potential critical line detachment (e.g. bond wire detachment);
C1 capacitor;
CNRT control for HS and LS transistors of a squib;
Cp second capacitor. Typically, the second capacitor is the parasitic gate capacitor of the second transistor T2;
D drain;
G gate of the second transistor;
I4 output current of the transconductance amplifier OTA;
IC integrated circuit;
IC_GND reference potential or reference potential line of the integrate circuit IC;
OTA transconductance amplifier;
PCB printed circuit board;
PCB_GND reference potential or reference potential line of the printed circuit board PCB;
R1 first resistor;
R2 second resistor;
R3 third resistor (controlled system element of the controlled system of the emergency control circuit);
R4 fourth resistor;
R5 fifth resistor;
R6 sixth resistor;
RE common controller of the main control circuit and the emergency control circuit;
RSG controlled system element of the controlled system of the main control circuit;
RSHRK controlled system of the main control circuit;
RSNRK controlled system of the emergency control circuit;
S source;
S1 first switch;
S1CB control block for the first switch S1;
SL squib load, also referred to as safety-relevant load;
SOA abbreviation (no reference numeral). Safe operating area;
SQUIB squib of an airbag;
T1 first transistor;
T2 second transistor (controlled system element of the controlled system of the main control circuit);
T3 third transistor;
T4 fourth transistor;
V2 second node where a set value is predefined from outside. The second node is connected to the positive input + of the transconductance amplifier OTA;
V3 third node;
V4 fourth node. The fourth node represents the output of the transconductance amplifier OTA;
V5 fifth node;
V6 sixth node;
V7 seventh node;
V7' internal seventh node inside the integrated circuit, which is detached by detachment, for example a line detachment BWB, from the seventh node V7;
VBT connecting component of the controlled system of the emergency control circuit;
VDD supply voltage (e.g. 33 V) or supply voltage line;
VL load voltage

REFERENCE LIST

DE 197 48 311 A1
DE 10 2005 045 233 A1
DE 103 02 789 B3
DE 10 2005 008 905 A1
DE 10 2005 030 770 A1
DE 60 2004 006 973 T2 (EP 1 602 532 B1)
DE 102 55 115 B3
DE 10 2010 028 544 A1
WO 2004/087486 A1

What is claimed is:

1. A method for controlling a voltage for a safety-relevant load which is sensitive to voltage values outside a nominal safe operating area, comprising:
performing the control of the voltage for the safety-relevant load by a main control circuit processing electric signals, and
performing the control of the voltage for the safety-relevant load by an emergency control circuit processing electric signals, when the main control circuit is interrupted,
wherein the emergency control circuit is automatically activated when the main control circuit is interrupted; and
wherein the main control circuit and the emergency control circuit comprise a common controller to whose input a control deviation variable is applied which is defined as a difference between a reference variable as a set value and a control variable as an actual value, that each of the main control circuit and the emergency control circuit respectively comprises its own controlled system including a respective input and a respective output, the controlled systems being connected in parallel and connecting the output of the common controller to a feedback line for the control variable, wherein the output of the controlled system of the emergency control circuit is connected to the feedback line at a connecting node, which output is arranged at a smaller distance to the input of the common controller than the output of the controlled system of the main control circuit, and that the main control circuit is active when a section of the feedback line between the output of the controlled system of the main control circuit and the connecting node is not interrupted, and that in case of an interruption of this section of the feedback line the emergency control circuit automatically operates.

2. The method according to claim 1, wherein each of the main control circuit and the emergency circuit respectively comprises a controlled system having an electric impedance and that the impedance of the controlled system of the emergency control circuit is larger than the impedance of the controlled system of the main control circuit.

3. The method according to claim 1, wherein the feedback line comprises a voltage divider having a central tapping node which is connected to the input of the common controller for feeding back a value representing a control signal and being smaller than the voltage value produced at the safety-relevant load.

4. The method according to claim 1, wherein as a common controller, a controller having an I-component compensating the control deviation signal to 0 is used.

5. A method for controlling a voltage for a safety-relevant load which is sensitive to voltage values outside a nominal safe operating area comprising:
performing the control of the voltage for the safety-relevant load by a main control circuit processing electric signals, and
performing the control of the voltage for the safety-relevant load by an emergency control circuit processing electric signals, when the main control circuit is interrupted,
wherein:
the emergency control circuit is automatically activated when the main control circuit is interrupted;
for controlling the voltage by both the main control circuit and the emergency control circuit, a controller is used whose output as an actuating signal is supplied via an electric control line to a controlled system which comprises an electric controlled system element having a controllable alterable resistor which is connected in series with the safety-relevant load, wherein the actuating signal influences the value of the resistor,
the controller is supplied with a difference as an input variable between a reference signal and a control signal, wherein the reference signal is defined as an upper limit value of the nominal safe operating area and the control signal is the output signal of the controlled system and thus the voltage value produced at the safety-relevant load, and wherein the control signal as a feedback signal is fed back to the controller via an electric feedback line for producing a control deviation signal,
between the electric control line and the feedback line an electric connecting component connecting these two lines is arranged, wherein the electric connecting component represents a voltage difference between the actuating signal and the control signal,
the main control circuit comprises the controller and the controlled system,
the emergency control circuit comprises the controller and the electric connecting component, and
control of the voltage for the safety-relevant load automatically transitions from the main control circuit to the emergency control circuit in case of an interruption of the feedback line occurring between the output of the controlled system and a connecting node of the electric connecting component and feedback line.

6. The method according to claim 5, wherein each of (1) the electric controlled system element of the controlled system of the main control circuit and (2) the electric connecting component of the controlled system of the emergency control circuit respectively has an electric impedance, wherein the impedance of the electric connecting component is larger than the impedance of the controlled system element.

7. The method according to claim 5, wherein the electric connecting component comprises one or a plurality of electric and/or electronic components.

8. The method according to claim 5, wherein the controlled system element is voltage-controlled and the actuating signal is a voltage signal, and that the electric connecting component comprises a resistor which is connected between the electric control line and the feedback line.

9. The method according to claim 5, wherein the electric connecting component comprises a unidirectionally electrically conducting blocking component, wherein the unidirectionally conducting blocking component suppresses a current flow from the connecting node of the feedback line to the electric control line and allows said current flow in a reverse direction.

10. The method according to claim 5, wherein the controlled system element comprises a transistor having a control terminal for receiving the actuating signal existing at the output of the controller and a current path which is variable in terms of its ohmic resistance and to which the safety-relevant load is series-connected.

11. A device for controlling a voltage for a safety-relevant load which is sensitive to voltage values outside a nominal safe operating area, comprising
a main control circuit comprising a controller having an input for a control deviation signal as well as an output for outputting an actuating signal, and a controlled system influencing the voltage at the safety-relevant load as a control signal,
wherein the output of the controller is connected to the input of the controlled system via a control line and the control signal at the output of the controlled system is adapted to be fed back to the input of the controller via a feedback line,
wherein the control deviation signal is a difference between the control signal and a reference signal which is defined as an upper limit value of the nominal safe operating area, and
an emergency control circuit which comprises the controller and an electric connecting component arranged in parallel to the controlled system and connecting the control line to the feedback line,
wherein, when the control signal whose function is to produce the control deviation signal is omitted, the signal is automatically produced as a difference between (1) the signal at a connecting node of the electric connecting component and feedback line and (2) the reference signal.

12. The device according to claim 11, wherein the main control circuit and the emergency control circuit comprise a common controller at whose input a control deviation variable exists which is defined as a difference between a reference variable as a set value and a control variable as an actual value, that each of the main control circuit and the emergency control circuit respectively comprises its own controlled system including a respective input and a respective output, said controlled systems being connected in parallel and connecting the output of the common controller to the feedback line for the control variable, wherein the output of the controlled system of the emergency control circuit is connected to the feedback line at the connecting node, which output is arranged at a smaller distance to the input of the common controller than the output of the controlled system of the main control circuit, and that the main control circuit is active when a section of the feedback line between the output of the controlled system of the main control circuit and the connecting node is not interrupted and in case of an interruption of this section of the feedback line the emergency control circuit automatically operates.

13. The device according to claim 11, wherein each of the controlled systems of the main control circuit and the emergency control circuit respectively has an electric impedance, wherein the impedance of controlled system of the emergency control circuit is larger than the impedance of the main control circuit.

14. The device according to claim 13, wherein each of (1) an electric controlled system element of the controlled system of the main control circuit and (2) the electric connecting component of the controlled system of the emergency control circuit respectively has an electric impedance, wherein the impedance of the electric connecting component is larger than the impedance of the controlled system element.

15. The device according to claim 11, wherein the electric connecting component comprises one or a plurality of electric and/or electronic components.

16. The device according to claim 11, wherein across the electric connecting component a voltage difference between the actuating signal and the control signal drops.

17. The device according to claim 11, wherein a controlled system element of the controlled system is voltage-controlled, and the actuating signal is a voltage signal, and that the electric connecting component comprises a resistor which is connected between the control line and the feedback line.

18. The device according to claim 11, wherein the electric connecting component comprises a unidirectionally electrically conducting blocking component, wherein the unidirectionally conducting blocking component suppresses a current flow from the connecting node of the feedback line to the control line and allows said current flow in a reverse direction.

19. The device according to claim 11, wherein a controlled system element of the controlled system comprises a transistor having a control terminal for receiving the actuating signal existing at the output of the controller and a current path which is variable in terms of its ohmic resistance and to which the safety-relevant load is series-connected.

20. The device according to claim 11, wherein the feedback line comprises a voltage divider having a central tapping node which is connected to the input of the controller for feeding back a value representing the control signal and being smaller than the voltage value produced at the safety-relevant load.

21. The device according to claim 11, wherein as a common controller a controller having an I-component compensating the control deviation signal to 0.

* * * * *